(12) United States Patent
Rangel Kuoppa et al.

(10) Patent No.: US 10,713,792 B1
(45) Date of Patent: Jul. 14, 2020

(54) SYSTEM AND APPARATUS FOR IMAGE PROCESSING

(71) Applicant: AMAZON TECHNOLOGIES, INC., Seattle, WA (US)

(72) Inventors: Risto Fermin Rangel Kuoppa, Seattle, WA (US); Sergio Damo De Lemos, Heredia (CR); Munir Mahmood, Bellevue, WA (US); Mohammed Nazeeruddin, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 231 days.

(21) Appl. No.: 15/406,241

(22) Filed: Jan. 13, 2017

(51) Int. Cl.
*G06T 5/00* (2006.01)
*G06T 7/13* (2017.01)
(Continued)

(52) U.S. Cl.
CPC .............. *G06T 7/11* (2017.01); *G06K 9/4604* (2013.01); *G06K 9/4652* (2013.01); *G06K 9/6212* (2013.01); *G06T 5/005* (2013.01); *G06T 7/13* (2017.01); *G06T 7/136* (2017.01); *G06T 7/194* (2017.01); *G06T 7/90* (2017.01); *G06T 11/001* (2013.01); *G06T 11/60* (2013.01);
(Continued)

(58) Field of Classification Search
CPC .. G06K 9/4604; G06K 9/4652; G06K 9/6212; G06T 1/20; G06T 7/11; G06T 7/13; G06T 7/136; G06T 7/194; G06T 7/90; G06T 11/001; G06T 11/60; G06T 2207/10004; G06T 2207/10024; G06T 5/005
See application file for complete search history.

(56) References Cited

U.S. PATENT DOCUMENTS 5,119,440 A * 6/1992 Duenyas .............. H04N 1/3872
382/199
5,210,799 A * 5/1993 Rao ...................... G06K 9/3241
348/26

(Continued)

OTHER PUBLICATIONS

Han et al. ("Extracting Region with Holes with Edge Expanding Method," International Conference on Multimedia Information Networking and Security, Nov.18-20, 2009, vol. 2, pp. 270-273) (Year: 2009).*

(Continued)

*Primary Examiner* — Yubin Hung
(74) *Attorney, Agent, or Firm* — Lindauer Law, PLLC

(57) ABSTRACT

A system for processing a seller provided input image depicting an object. The system may process the input images to be in compliance with an online shopping website's image requirements. The image processing service may execute multiple modules on the input image. An edge detection module may detect one or more edges of the image of the object and determine border data indicative of a border around the object. An object of interest module may extract the image of the object within the border to generate an object of interest image. A background extraction module may create one or more closed shapes to separate the image of the object from background pixels. A hole detection module may traverse the one or more closed shapes to determine a presence of background pixels, remove the background pixels, and generate a resulting image.

20 Claims, 6 Drawing Sheets

(51) Int. Cl.
*G06T 7/194* (2017.01)
*G06K 9/46* (2006.01)
*G06T 7/11* (2017.01)
*G06T 7/136* (2017.01)
*G06T 11/00* (2006.01)
*G06K 9/62* (2006.01)
*G06T 7/90* (2017.01)
*G06T 11/60* (2006.01)
*G06T 1/20* (2006.01)

(52) U.S. Cl.
CPC ...... *G06T 1/20* (2013.01); *G06T 2207/10004* (2013.01); *G06T 2207/10024* (2013.01)

(56) References Cited

U.S. PATENT DOCUMENTS

| | | | | | |
|---|---|---|---|---|---|
| 5,335,298 | A * | 8/1994 | Hevenor | ............ | G06K 9/4604 382/199 |
| 6,681,043 | B1 * | 1/2004 | Lau | ............ | G06F 3/0481 375/E7.076 |
| 2001/0040982 | A1 * | 11/2001 | Kim | ............ | G06K 9/00228 382/103 |
| 2003/0128873 | A1 * | 7/2003 | Bronson | ............ | H04N 1/38 382/163 |
| 2005/0254700 | A1 * | 11/2005 | Nagata | ............ | G06T 7/0004 382/149 |
| 2006/0210338 | A1 * | 9/2006 | Hirano | ............ | G06T 7/0006 400/62 |
| 2007/0154113 | A1 * | 7/2007 | Chang | ............ | G01B 21/045 382/286 |
| 2008/0309777 | A1 * | 12/2008 | Aoyama | ............ | G06K 9/00228 348/222.1 |
| 2009/0232348 | A1 * | 9/2009 | Abraham | ............ | G06K 9/00 382/100 |
| 2010/0054592 | A1 * | 3/2010 | Nanu | ............ | G06T 5/008 382/167 |
| 2010/0128927 | A1 * | 5/2010 | Ikenoue | ............ | G06K 9/00261 382/103 |
| 2010/0329513 | A1 * | 12/2010 | Klefenz | ............ | G01C 21/00 382/104 |
| 2011/0007946 | A1 * | 1/2011 | Liang | ............ | A61B 5/1113 382/103 |
| 2011/0052043 | A1 * | 3/2011 | Hyung | ............ | G06T 7/277 382/154 |
| 2011/0228050 | A1 * | 9/2011 | Wang | ............ | G05B 19/4015 348/46 |
| 2012/0020523 | A1 * | 1/2012 | Ikeda | ............ | G01B 11/005 382/103 |
| 2012/0189202 | A1 * | 7/2012 | Kan | ............ | G06F 17/241 382/176 |
| 2013/0229695 | A1 * | 9/2013 | Lei | ............ | H04N 1/38 358/448 |
| 2016/0235390 | A1 * | 8/2016 | Ichikawa | ............ | A61B 8/481 |
| 2016/0248984 | A1 * | 8/2016 | Li | ............ | G06T 3/40 |

OTHER PUBLICATIONS

Shivaranjani et al. ("A survey on inpainting techniques," International Conference on Electrical, Electronics, and Optimization Techniques, Mar. 3-5, 2016) (Year: 2016).*

Komati et al. ("A Strategy for Boundary Detection Combining Region and Edge Information," 24th SIBGRAPI Conference on Graphics, Patterns and Images, Aug. 28-31, 2011) (Year: 2011).*

Zhang et al. ("Color Image Edge Detection Arithmetic Based on Color Space," International Conference on Computer Science and Electronics Engineering, Mar. 23-25, 2012) (Year: 2012).*

* cited by examiner

SYSTEM AND APPARATUS FOR IMAGE PROCESSING

BACKGROUND

Digital imaging technologies have enabled users to capture, edit, and manipulate digital images. However, these digital imaging technologies may consume many resources and have long lead times while processing the digital images to be published.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
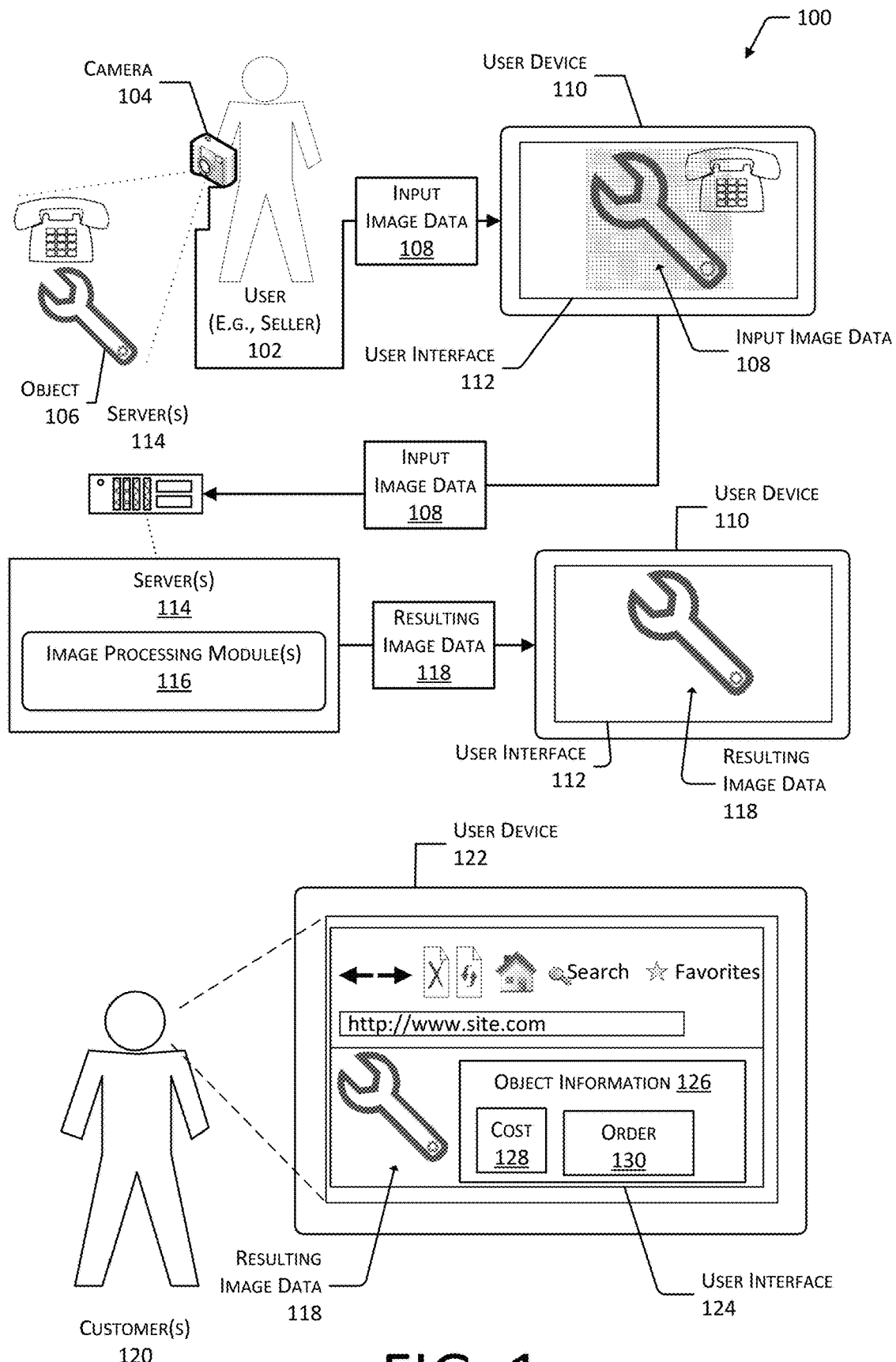
FIG. 1 depicts a schematic of a system for processing an input image depicting an object.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

More and more Internet users are realizing the ease and convenience of buying and selling online. The success of online shopping websites depends upon the ability to provide an enjoyable shopping experience and an easy-to-use environment in which sellers can upload images of items to sell efficiently. Current online shopping websites have certain guidelines for submitting images to their online shopping websites. For example, the guidelines may include background color, number of items within an image, aesthetic requirements, technical requirements, standard naming conventions, and so forth. These guidelines create a situation where sellers may wait several hours to several days for the image to be reviewed and either approved for use on the website or rejected with feedback about how the provided image is not in accordance with the guidelines.

This disclosure describes systems and apparatus for processing images. The system may be an image processing pipeline that includes multiple modules that gradually transform an input image to converge in a resulting image that includes a background that has been removed as well as the background from any hole on the object of interest independently of the hole's shape. The background within the input image may be a non-uniform colored background with varying tones of shades and may include textured patterns with low-frequency transitions. The object of interest may be a solid opaque object whose color may or may not be similar to those of the background yet have a high-frequency transition at an edge associated with the object.

During a first implementation, the system provides an image processing service for sellers to submit images to be processed to place the images into compliance with image submission guidelines. A seller may acquire an image of an object and upload or otherwise transfer the image to the image processing service. For example, the image may depict a wrench. The image processing service may execute multiple modules on the image. Continuing the example, the image processing service may execute a module that locates the image of the wrench within the image. The image processing service may next extract the image of the wrench from the image to generate an object of interest image. The image includes the image of the wrench and a white background. The image processing service may execute additional modules to further refine the object of interest image in accordance with the image submission guidelines. The image processing service may store or send a resulting image depicting the object to the seller. The seller may upload the image to the online shopping website for customers to view and purchase the object.

During a second implementation of the operation of the system, a seller may provide an input image of an object to be uploaded to the online shopping website. The object may be goods, services, clothing, food, music, electronic books (e-books), audio books, other content, and so forth. The image processing service may be configured to use one or more modules to generate a resulting image in compliance with the image submission guidelines.

An edge detection module may be configured to detect one or more possible edges of the object within the input image. The edge detection module may detect the one or more edges by determining an initial convolution mask that is used in the edge-detection module. For example, the object within the input image may be a wrench. The edge detection module may determine a group pixels that have a high probability of being an edge of the image of the wrench. The edge detection module may set the group of pixels associated with the color of the image of the wrench to grey. The edge detection module may also determine which pixels of the input image are background pixels. The edge detection module may set the pixels associated with the background pixels of the input image to black. In this example, if the pixels are rendered then the seller may see an image depicting a black background with grey pixels around a perimeter of the image of the wrench. A benefit of the edge detection module implementing this technique is the production of relatively defined edges. This minimizes or eliminates additional post-processing such as repeating the edge detection or manually editing a finished image. In other implementations, other edge detection techniques may be used.

After completion of detecting the one or more edges, an edge enhancement module may determine border data indicative of a border around the object. The edge enhancement module, which determines the border data, may compare the one or more edges to an edge threshold value to discretize whether the detected edge accurately represents an edge of the object or not. For example, a portion of the detected edge of the image of the wrench may include a number of background pixels and foreground pixels associated with the image of the wrench. This portion of the detected edge may appear to look like an abnormality on the image of the wrench. The edge enhancement module may determine that this abnormality is a false edge and remove the false edge from the detected edges. The border around the possible object(s) of interest enables a false-positive identification module to specify an area of interest depicting the object.

The false-positive identification module may specify the area of interest by a determination that a particular area occupies a greater amount of space with respect to other areas within the borders determined in the previous module. For example, the false-positive identification module may determine that a first area depicting the image of the wrench edges contains more pixels of the input image than a second area depicting the telephone edges within the input image. The false-positive identification module may compare the count of pixels associated with the first area and the second area and determine that the first area depicting the image of the wrench is the object of interest. A benefit of the false-positive identification module is that the false-positive identification module eliminates the need for the image processing service to request further data from the seller to identify the object of interest. By not having to make additional requests, the image processing service is able to reduce the total time to process the input image by minimizing or eliminating human interaction.

After specifying the area of interest, an object of interest module may extract the area of interest depicting the object to generate an object of interest image. By previously specifying the area of interest, the amount of background pixels from the input image in the object of interest image is increased. The removal of false-positive pixel regions in the object of interest image reduces the amount of processing to extract the foreground pixels.

A background extraction module may create one or more closed shapes to separate the object of interest from the background pixels. By separating the object of interest from the background pixels, this reduces the processing time for a hole detection module, as the hole detection module does not have to traverse all the pixels in the original input image. The hole detection module may determine whether the region of the object of interest includes one or more holes. The hole detection module may determine that the object has the one or more holes by traversing the region of the object of interest and searching for the presence of background pixels. For example, the image of the wrench may include a hole at one end. The hole detection module, when traversing the object of interest image depicting the image of the wrench, may determine that the hole includes background pixels. The hole detection module upon this determination may remove the background pixels within the hole and replace them with white background-fill pixels to generate a resulting image. The resulting image may be stored in memory for the seller to access or the resulting image may be sent to the seller. The seller upon accessing the resulting image may upload the resulting image to the online shopping website for customers to view and purchase the object.

By using the techniques and systems described above, the amount of time to process an image is reduced and human interaction is minimized. Reducing the amount of time to process the input image also reduces the amount of time a seller uses to set up an object for sale. Additional benefits of reducing the processing time includes conservation of memory allocation, processor requirements, network bandwidth, and so forth. In addition, the reduction of processing time enables the systems to process more input images during a given time period. Furthermore, user experience is improved for both the seller and customers as the user interface depicting the objects is more consistent.

Illustrative System

FIG. 1 depicts a schematic of a system 100 for processing an input image depicting an object. The system 100 may include a user 102. The user 102 may be a seller, vendor, merchant, company, individual, retailer, wholesaler, and so forth. The user 102 may use a camera 104 to capture an image of an object 106. The object 106 may be goods, an image depicting services, clothing, food, music, e-books, audio books, other content, and so forth. The image of the object 106 may be a digital image. The user 102 may upload the image as input image data 108 to a user device 110. The user device 110 may include a desktop computer, a tablet computer, a wearable computer, an e-book reader, a media device, a cellular phone, a smartphone, a laptop computer, or another suitable apparatus. In other implementations, the user 102 may upload a digital representation of the object 106. For example, the digital representation may be a computer-generated rendering, an image copied from a website, a hand drawn image which is scanned and uploaded to the user device 110, and so forth. Continuing the example, the input image data 108 may comprise a photorealistic rendering generated by a computer-aided design (CAD) application.

The user device 110 may provide a user interface 112. The user interface 112 may depict the input image data 108. For example, the input image data 108 may depict a wrench and a telephone as acquired by the user 102 using the camera 104. In this example, the user interface 112 may depict the "raw" or unprocessed input image data 108 of the wrench and the telephone.

The user 102 may upload the input image data 108 to an online shopping website. The online shopping website may be associated with server(s) 114. In other implementations, the user 102 may access previously stored data depicting the object 106 and upload the previously stored data to the online shopping website. The previously stored data may be stored in a memory of the user device 110, stored on an external memory device, network accessible storage, or other device which the user device 110 may access, a data storage which may span across multiple servers that the user device 110 may access, and so forth. The server 114 may acquire the input image data 108 and upload or otherwise transfer the input image data 108 to image processing module(s) 116, which may reside on the server 114 or another service. In other implementations, the image processing module(s) 116 may be downloaded or included on the user device 110 or a portion of the image processing module(s) 116 may be downloaded or included on the user device 110, while the remaining image processing module(s) 116 reside on the server 114 or other services.

The image processing module(s) 116 may provide an image processing pipeline that includes multiple modules that transform the input image data 108 into a resulting image for which the background of the input image data 108 has been removed. This includes the background visible within holes of the object 106. In one implementation, the background within the input image data 108 may be a non-uniform colored background with varying tones or shades and may include textured patterns with low-frequency transitions. In other implementations, the background within the input image data 108 may be a uniform colored background. The object 106 of interest may be a solid opaque object or non-opaque object whose color may or may not be similar to those of the background yet have a high-frequency transition at an edge associated with the object 106. The image processing module(s) 116 may be configured to transform the input image data 108 into the resulting image, as described throughout, regardless of whether the background of the input image data 108 is uniform or non-uniform or that the object 106 of interest is a solid opaque object or non-opaque object.

The image processing module(s) 116 may process the input image data 108 to generate resulting image data 118. For example, the image processing module(s) 116 may execute a first module that locates the image of the wrench within the input image data 108. The first module may locate the image of the wrench within the input image data 108 by using an edge detection module 202, as in FIG. 2. The edge detection module 202 may locate the image of the wrench within the input image data 108 to determine a first group of pixels depicting the image of the wrench and determine a second group of pixels that have a color pattern associated with the background. The color pattern associated with the background may include a range of color values. In other implementations, the color pattern may specify a range of colors in a certain group of adjacent pixels. For example, the edge detection module 202 may determine that the possible edges of the image of the wrench have a first color value and the background pixels have a second color value. The edge detection module 202 may set the color value of the possible edges to the color white or grey and the background pixels to the color black. The user 102 may see an image depicting a black background with a white or grey edge around a perimeter of the image of the wrench. The edge detection module 202 may determine a transition between the first group of pixels and the second group of pixels, which enable the edge detection module 202 to determine the location of the image of the wrench within the input image data 108.

The image processing module(s) 116 may extract the image of the wrench from the input image data 108 to generate an object of interest image. The image processing module(s) 116 may use an object of interest module 214, as in FIG. 2, to extract the image of the wrench from the input image data 108 to generate the object of interest image. The object of interest module 214 may determine the area of interest based on false-positive image data 212 indicative of the area with the highest percentage value. The area with the highest percentage value may be associated with the image of the wrench. To extract the image of the wrench from the input image data 108, the object of interest module 214 may copy or create a temporary image indicative of the area of interest depicting the image of the wrench. The image processing module(s) 116 may generate the object of interest image based on the temporary image generated by the object of interest module 214. For example, the object of interest image may include the image of the wrench and a white background. The image processing module(s) 116 may execute additional modules to further refine the object of interest image in accordance with the image submission guidelines. The image processing module(s) 116 may store resulting image data 118 indicative of the object of interest image or send the resulting image data 118 to the user device 110.

The user device 110, via the user interface 112, may be configured to display the resulting image data 118 to the user 102. For example, the user device 110 may display the image of the wrench and the white background to the user 102. The user 102 may upload the resulting image data 118 to the online shopping website for customers 120 to view and purchase the object 106. In other implementations, the image processing module(s) 116 may automatically upload the resulting image data 118 to the online shopping website.

The customer 120 may access, via a user device 122, a user interface 124 to enable the customer 120 to view the processed image data 118. The user interface 124 may be a website user interface, a mobile application user interface, and so forth. In other implementations, the user 102 may access, via the user device 110, the user interface 124 to enable the user 102 to view and provide input, as described below, to the image processing module(s) 116. In this implementation, the user 102 may provide input during the processing of the input image data 108.

The user interface 124 may also enable the customer 120 to view object information 126 associated with the processed image data 118. For example, the object information 126 associated with the wrench may include wrench type, brand, wrench length, minimum opening, maximum opening, hand tool type, individual wrench or a set of wrenches, material, and so forth. The object information 126 may also include cost 128, which may be indicative of the cost of the object 106 and an order button 130. The order button 130 may enable the customer 120 to order the object 106 associated with the processed image data 118.

The user device 122 may be a desktop computer, a tablet computer, a wearable computer, an e-book reader, a media device, a cellular phone, a laptop computer, or another suitable apparatus.

The image processing module(s) 116, as described above, may include machine learning, which enables the image processing module(s) 116 an ability to learn without being explicitly programmed. For example, the image processing module(s) 116 may be configured to learn and detect the one or more edges more accurately, determine whether the determined one or more holes are part of the object 106 of interest or not, and so forth.

Figure 2:
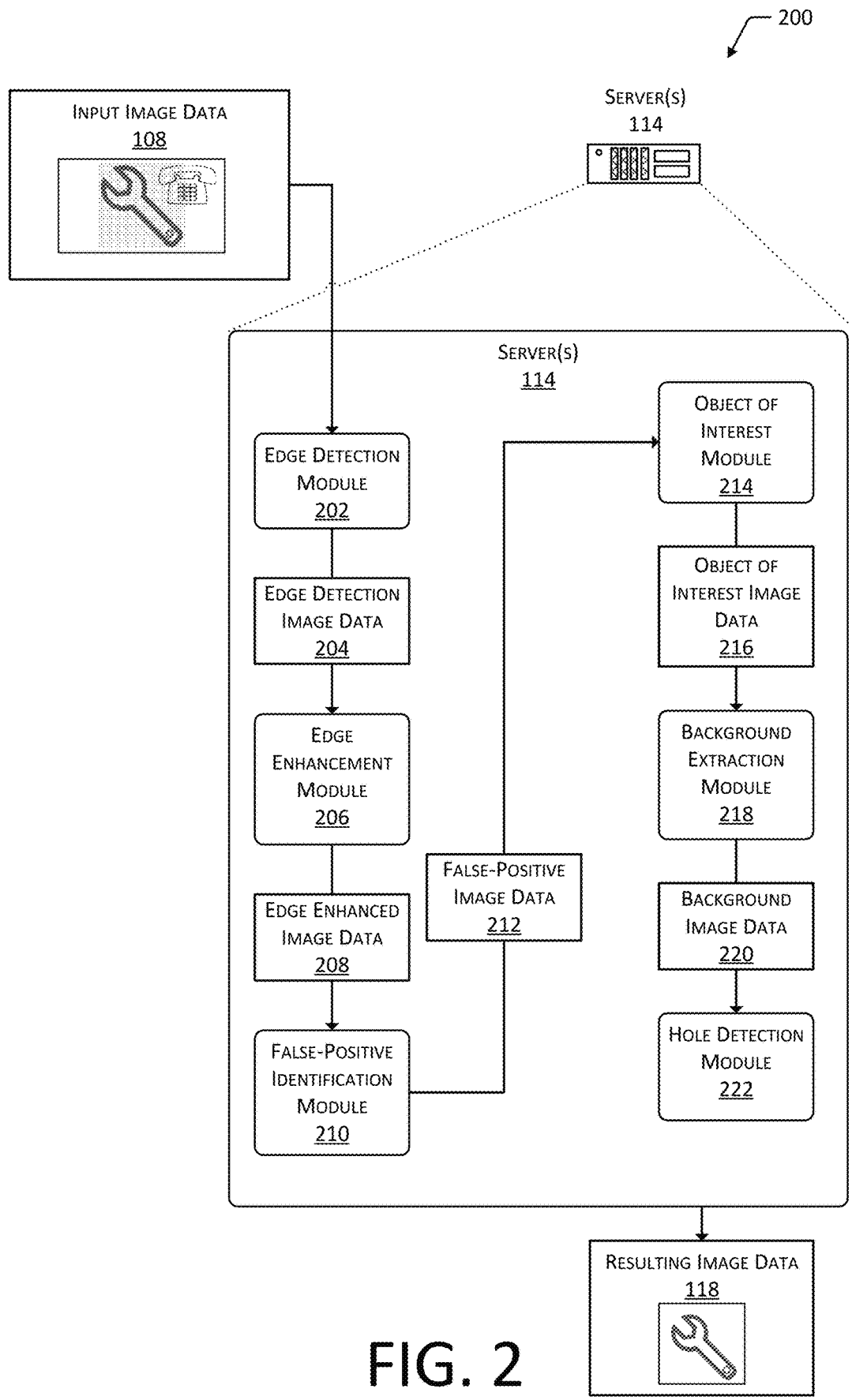
FIG. 2 depicts a schematic of a system including a server for processing an input image depicting an object.

FIG. 2 depicts a schematic of a system 200 including the server 114 for processing the input image data 108 depicting the object 106. The server 114 may receive the input image data 108, as described above. The server 114 may be configured to use one or more modules to generate the resulting image data 118 in compliance with the image submission guidelines.

The server 114 may include an edge detection module 202. The edge detection module 202 may be configured to determine a first group of pixels that correspond to the object of interest. The edge detection module 202 may be configured to determine a second group of pixels that have a color-pattern value that corresponds to the background. The color pattern associated with the background may include a range of color values. For example, the object 106 associated with the input image data 108 may be a wrench. The edge detection module 202 may determine that the color of the edges of the image of the wrench has a first color value. The edge detection module 202 may set the first group of pixels associated with the color of the edges of the image of the wrench to white or grey. The edge detection module 202 may also determine implicitly possible background regions within the input image. The edge detection module 202 may set the second group of pixels associated with the color of the background and non-edges of the image of the object 106 to black. In this example, the user 102 may see an image depicting a black background with a white or grey edge around a perimeter of the image of the wrench. In another implementation, the edge detection module 202 may be configured to determine groups of pixels associated with image of other objects within the input image data 108. For example, the other objects within the input image data 108 may represent a telephone. The edge detection module 202 may determine that the color of the edges of the image of the telephone has a first color pattern. The edge detection module 202 may set the first group of pixels associated with the color of the edges of the image of the telephone to white or grey.

The edge detection module 202 may also be configured to detect one or more edges of the image of the object 106 within the input image based on a determination of a transition between the first group of pixels and the second group of pixels. For example, the edge detection module 202 may detect the one or more edges by convolving along each row of pixels to determine when there is a transition between background pixels and the object of interest pixels. The edge detection module 202 may continue labeling pixels and determining when there is a transition between the background pixels and the object of interest pixels.

In other implementations, the edge detection module 202 may include an algorithm to determine the group of pixels that have a high probability of being one or more edges of the image of the object 106 of interest and a second group of pixels that are associated with background pixels or interior pixels of the image of the object 106 of interest within the input image. One implementation of the algorithm is described next in Algorithm 1.

ALGORITHM 1

Input:

A digital image I of size X by Y, where I: ($\mathbb{N}_0^2 \to \{[0 \ldots 255]^3]\}$): $\{(x, y) \to (Component_{Red}, Component_{Green}, Component_{Blue})\}$ and $x \in \{0 \ldots X-1\}$, $y \in \{0 \ldots Y-1\}$ Output:

A digital image OriginalEdges of size X by Y, where OriginalEdges: ($\mathbb{N}_0^2 \to \{[0 \ldots 255]^3]\}$): $\{(x, y) \to (Component_{Red}, Component_{Green}, Component_{Blue})\}$ and $x \in \{0 \ldots X-1\}$, $y \in \{0 \ldots Y-1\}$ Algorithm:

$$MaskLowerBound(x, y) = \forall\, m \in M_x \in m < 0\; \Sigma\, m$$

$$ConvolvedValues_x(x, y, c) = \forall\, c \in \{R, G, B\} \sum_{x_i=0}^{m-1} \sum_{y_i=0}^{n-1} OriginalEdges[x_i, y_i, c] M_x[x - x_i, y - y_i]$$

$$ConvolvedValues_y(x, y, c) = \forall\, c \in \{R, G, B\} \sum_{x_i=0}^{m-1} \sum_{y_i=0}^{n-1} I[x_i, y_i, c] M_y[x - x_i, y - y_i]$$

$$AccValues_x(x, y, c) = ConvolvedValues_x(x, y, c) - \frac{MaskLowerBound(x, y)}{256} * 255$$

$$AccValues_y(x, y, c) = ConvolvedValues_y(x, y, c) - \frac{MaskLowerBound(x, y)}{256} * 255$$

$$MirroredValues_x(x, y, c) = \begin{cases} (128 - AccValues_x(x, y, c)) * 2 & \text{if } \left(\frac{\sum AccValues_x(x, y, c)}{3}\right) < 128\, \forall\, c \\ (AccValues_x(x, y, c) - 128) * 2 & \text{if } \left(\frac{\sum AccValues_y(x, y, c)}{3}\right) \geq 128\, \forall\, c \end{cases}$$

$$MirroredValues_y(x, y, c) = \begin{cases} (128 - AccValues_y(x, y, c)) * 2 & \text{if } \left(\frac{\sum AccValues(x, y, c)}{3}\right) < 128\, \forall\, c \\ (AccValues_y(x, y, c) - 128) * 2 & \text{if } \left(\frac{\sum AccValues(x, y, c)}{3}\right) \geq 128\, \forall\, c \end{cases}$$

$$G_x(x, y, c) = \frac{\sum MirroredValues_x(x, y, c)}{3}$$

$$G_y(x, y, c) = \frac{\sum MirroredValues_y(x, y, c)}{3}$$

$$OriginalEdges(x, y, c) = \sqrt{G_x(x, y, c)^2 + G_y(x, y, c)^2} \quad \text{where:}$$

$c \in \{Component_{Red}, Component_{Green}, Component_{Blue}\}$ $$M_x[x, y, c] = \begin{bmatrix} -2 & 0 & +2 \\ -3 & 0 & +3 \\ -2 & 0 & +2 \end{bmatrix}, \quad M_y[x, y, c] = \begin{bmatrix} -2 & -3 & -2 \\ 0 & 0 & 0 \\ +2 & +3 & +2 \end{bmatrix}$$

Variables description:
x, y : Integer values used as image coordinates
I, OriginalEdges : Colored (32-bit) Bi-dimensional Digital images of size width X and height Y The edge detection module 202 may be configured to generate edge detection image data 204 indicative of the detected one or more edges. The edge detection module 202 may be configured to send the edge detection image data 204 to an edge enhancement module 206. In another implementation, the edge detection module 202 may store the edge detection image data 204 in memory for the edge enhancement module 206 to access.

The edge enhancement module 206 may be configured to determine border data indicative of a border around the image of the object 106 within the input image. The edge enhancement module 206 may determine the border data by comparing the one or more detected edges to an edge threshold value to determine whether the detected edges accurately represent an edge of the image of the object 106 or not. For example, a detected edge of the image of the wrench may include a number of background pixels and foreground pixels associated with the image of the wrench. This portion of the detected edge may appear to look like an abnormality on the wrench. The edge enhancement module 206 may determine that this abnormality is a false edge and remove the false edge from the detected edge. In another example, the portion of the detected edge of the image of the wrench may include a number of foreground pixels associated with an edge of the image of the wrench and a number of foreground pixels associated with an edge of the image of the telephone. In this example, the portion of the detected edges of the image of the wrench that meet or come in contact with the detected edges of the image of the telephone may appear to look like an abnormality.

In other implementations, the edge enhancement module 206 may be based on a human perception of the image of the object 106 within the input image. The human perception of the image of the object 106 may be associated with an algorithm to determine the border data indicative of the border around the image of the object 106 within the input image. One implementation of the algorithm is described next in Algorithm 2.

The edge enhancement module 206 may be configured to generate edge enhanced image data 208 indicative of the border data. The edge enhancement module 206 may be configured to store or send the edge enhanced image data 208 to a false-positive identification module 210 to access.

The false-positive identification module 210 may be configured to specify an area of interest by a determination that a particular area has a higher count of pixels with respect to other areas within the input image data 108. In one implementation, the false-positive identification module 210 to specify the area of interest may determine a first count of pixels a first area has within the input image data 108. The false-positive identification module 210 may determine a second count of pixels a second area has within the input image data 108. The false-positive identification module 210 may determine a third, fourth, fifth, and so forth, count of pixels of a third, fourth, fifth, and so forth, area has within the input image data 108. After determining at least, the first area and the second area, the false-positive identification module 210 may compare the first count of pixels to the second count of pixels to determine which count of pixels is the highest. For example, the false-positive identification module 210 may determine that a first area depicting the image of the wrench edges has a higher count of pixels within the input image than the second area depicting the image of the telephone edges. The false-positive identification module 210 may determine that the first area depicting the image of the wrench is the object of interest based on the first area having a higher count of pixels than the second area.

In other implementations, the false-positive identification module 210 may be based on an algorithm, which may be configured to specify the area of interest by the determination that the particular area has a higher count of pixels with respect to other areas within the border. One implementation of the algorithm is described next in Algorithm 3.

---

ALGORITHM 2

---

Input:

A digital image OriginalEdges of size X by Y, where Original Edges: ($\mathbb{N}_0^2 \to \{[0 \ldots 255]^3\}$): $\{(x, y) \to$ (Component$_{Red}$, Component$_{Green}$, Component$_{Blue}$)$\}$ and $x \in \{0\ldots X-1\}$, $y \in \{0\ldots Y-1\}$.

A threshold value th $\in 0 \leq$ th $< 256$

Output:

A digital image EnhancedEdges of size X by Y, where EnhancedEdges: ($\mathbb{N}_0^2 \to \{[0 \ldots 255]^3\}$): $\{(x, y) \to$ (Component$_{Red}$, Component$_{Green}$, Component$_{Blue}$)$\}$ and $x \in \{0\ldots X-1\}$, $y \in \{0\ldots Y-1\}$ Algorithm:

$$\forall\, x \in (0, X],\ y \in (0, Y],\ c \in \{Component_{Red}, Component_{Green}, Component_{Blue}\}$$

$$EnhancedEdges(x, y) = \begin{cases} 0 & \text{if } \sum \frac{OriginalEdges(x, y, c)}{3} \leq th \\ 255 & \text{if } \sum \frac{OriginalEdges(x, y, c)}{3} > th \end{cases}$$

Variables description:

x, y : Integer values used as image coordinates

I, OriginalEdges, EnhancedEdges: Colored (32-bit) Bi-dimensional Digital images of size width X and height Y th: An integer value used to determine if a possible edge pixel is a definitive edge pixel or background

| ALGORITHM 3 |
| --- |

Input:

A digital image I of size X by Y, where I: $\mathbb{N}_0^2 \to \{[0 \ldots 255]^3\}$): $\{(x,y) \to$ (Component$_{Red}$, Component$_{Green}$, Component$_{Blue}$)$\}$ and $x \in \{0 \ldots X - 1\}$, $y \in \{0 \ldots Y - 1\}$.
A digital image EnhancedEdges of size X by Y, where EnhancedEdges: $\mathbb{N}_0^2 \to \{[0 \ldots 255]^3\}$): $\{(x, y) \to$ (Component$_{Red}$, Component$_{Green}$, Component$_{Blue}$)$\}$ and $x \in \{0 \ldots X - 1\}$, $y \in \{0 \ldots Y - 1\}$.
Output:

A LabeledRegions set containing subsets of pixels that belong to a same region as defined next:
Algorithm:

BorderBlackPixels: $\{(x, y): (x = 0 \text{ or } x = X - 1 \text{ or } y = 0 \text{ or } y = Y - 1) \text{ and EnhancedEdges}(x,y)$
$= 0\}$
   BackgroundPixels: $\{(x_n, y_n):$ EnhancedEdges$(x_n, y_n)$
$= 0$ and a path of pixels $((x_0, y_0), (x_1, y_1), (x_2, y_2), \ldots, (x_n, y_n))$ $\exists \ni (x_0, y_0)$
$\in$ BorderBlackPixels and $(x_{i-1}, y_{i-1}), (x_i, y_i)$ are "8 – neighbors" and i
$\in \{0, 1, \ldots, n\}$ $\}$
   LabeledRegions: $\{$Region$_i$:$(x, y) \in$ Region$_i$ iff $(x, y)$ is an 8-neighbor of $(x', y')$ and $(x', y')$
$\in$ Region$_i$ and $(x', y') \notin$ Region$_j$, $i \neq j\}$
Variables description:

x, y: Integer values used as image coordinates
I, EnhancedEdges: Colored (32-bit) Bi-dimensional Digital images of size width X and height Y
th: An integer value used to determine if a possible edge pixel is a definitive edge pixel or background
BorderBlackPixels, BackgroundPixels: Lists of pixel coordinates
LabeledRegions: A list of pixel coordinates with a number that indicates the numbered region to which the pixel belongs The false-positive identification module 210 may be configured to generate the false-positive image data 212 indicative of the specified area of interest. The false-positive identification module 210 may be configured to store or send the false-positive image data 212 to the object of interest module 214 to access.

The object of interest module 214 may be configured to extract the area of interest depicting the image of the object 106 to generate the object of interest image. The object of interest module 214 may determine the area of interest based on the false-positive image data 212 indicative of the area with the highest count of pixels. In one implementation, the object of interest module 214 may copy the area of interest depicting the image of the object 106. In this implementation, the object of interest module 214 may generate the object of interest image by using the copied area of interest depicting the image of the object 106. For example, the object of interest module 214 may receive the false-positive image data 212 indicative of the first area depicting the image of the wrench which has a higher count of pixels within the input image data 108 with respect to other areas. The object of interest module 214 may extract or copy the first area from the input image. The object of interest module 214 may use the extracted or copied first area depicting the image of the wrench to generate the object of interest image depicting the image of the wrench.

In other implementations, the object of interest module 214 may be based on an algorithm, which may be configured to extract the area of interest depicting the object 106 to generate the object of interest image. One implementation of the algorithm is described next in Algorithm 4.

| ALGORITHM 4 |
| --- |

Input:

A digital image I of size X by Y, where I: $\mathbb{N}_0^2 \to \{[0 \ldots 255]^3\}$): $\{(x, y) \to$ (Component$_{Red}$, Component$_{Green}$, Component$_{Blue}$)$\}$ and $x \in \{0 \ldots X-1\}$, $y \in \{0 \ldots Y-1\}$.
A set LabeledRegions as defined in Algorithm 3
Output:

A digital image ObjectOfInterest of size X by Y, where ObjectOfInterest: $\mathbb{N}_0^2 \to \{[0 \ldots 255]^3\}$): $\{(x, y) \to$ (Component$_{Red}$, Component$_{Green}$, Component$_{Blue}$)$\}$ and $x \in \{0 \ldots X-1\}$, $y \in \{0 \ldots Y-1\}$.
Algorithm:

Given BiggestRegionIndex = i Region$_i$ $\forall \in$ LabeledRegions and |Region$_i$| = Max(|Reigon$_j$|), j = $\{1, \ldots,$ |LabeledRegions|$\}$ $$ObjectOfInterest(x, y) = \begin{cases} 0 \text{ if } (x, y) \notin \text{Region}_{BiggestRegionIndex} \\ I(x, y, c) \forall c \text{ if } (x, y) \in \text{Region}_{BiggestRegionIndex} \end{cases}$$

Variables description:
x, y : Integer values used as image coordinates
I: Colored (32-bit) Bi-dimensional Digital images of size width X and height Y
LabeledRegions: A list of pixel coordinates with a number that indicates the numbered region to which the pixel belongs The object of interest module 214 may generate object of interest image data 216 indicative of the generated object of interest image. The object of interest module 214 may store or send the object of interest image data 216 to a background extraction module 218 to access.

The background extraction module 218 may create one or more closed shapes to separate the object 106 from background pixels. To create the one or more closed shapes, the background extraction module 218 may determine the background pixels within the object of interest image. After determining the background pixels, the background extraction module 218 may use the background pixels to create the one or more closed shapes. The pixels that are not determined to be background pixels may be associated with foreground pixels depicting the image of the object 106. For example, the background extraction module 218 may determine the background pixels in the object of interest image. The user 102 viewing an image depicting this determination may see an image with the background pixels determined and possibly represented by the color red to indicate the determination. The remaining portion of the image may be white indicating pixels that have not been determined. These white pixels may be associated with the image of the wrench. In this example, the image being depicted may be a red background with a white edge outlining the shape of the image of the wrench. The background extraction module 218 may create the one or more closed shapes around the outline of the image of the wrench.

In another implementation, the background extraction module 218 may determine the foreground pixels within the object of interest image. The foreground pixels may be associated with the image of the object 106. After determining the foreground pixels, the background extraction module 218 may use the foreground pixels to create the one or more closed shapes. The pixels that are not determined to be foreground pixels may be associated with the background pixels within the object of interest. For example, the background extraction module 218 may determine the foreground pixels in the object of interest image. The user 102 viewing an image depicting this determination may see an image with the foreground pixels determined and possibly represented by the color white to indicate the determination. The remaining portion of the image may be red indicating pixels that have not been determined. These red pixels may be associated with the background. In this example, the image being depicted would be a white wrench shape with a red background. The background extraction module 218 may create the one or more closed shapes around the outline of the image of the wrench.

In yet another implementation, the background extraction module 218 may determine the background pixels and the foreground pixels within the object of interest image to create the one or more closed shapes, as described above.

In other implementations, the background extraction module 218 may be based on an algorithm, which may be configured to create the one or more closed shapes. One implementation of the algorithm is described next in Algorithm 5.

---

ALGORITHM 5

Input:

A digital image I of size X by Y, where I: $\mathbb{N}_0^2 \rightarrow \{[0 \ldots 255]^3\}$: $\{(x, y) \rightarrow (\text{Component}_{Red}, \text{Component}_{Green}, \text{Component}_{Blue})$ and $x \in \{0 \ldots X - 1\}$, $y \in \{0 \ldots Y - 1\}$.
A digital image ObjectOfInterest of size X by Y, where ObjectOfInterest: $\mathbb{N}_0^2 \rightarrow \{[0 \ldots 255]^3\}$): $\{(x, y) \rightarrow (\text{Component}_{Red}, \text{Component}_{Green}, \text{Component}_{Blue})\}$ and $x \in \{0 \ldots X - 1\}$, $y \in \{0 \ldots Y - 1\}$.
A digital image EnhancedEdges of size X by Y, where EnhancedEdges: $\mathbb{N}_0^2 \rightarrow \{[0 \ldots 255]^3\}$): $\{(x, y) \rightarrow (\text{Component}_{Red}, \text{Component}_{Green}, \text{Component}_{Blue})$ and $x \in \{0 \ldots X - 1\}$, $y \in \{0 \ldots Y - 1\}$ defined as in algorithm 2

Output:

A digital image PerimetralBackground of size X by Y, where PerimetralBackground: $\mathbb{N}_0^2 \rightarrow \{[0 \ldots 255]^3\}$): $\{(x, y) \rightarrow (\text{Component}_{Red}, \text{Component}_{Green}, \text{Component}_{Blue})$ and $x \in \{0 \ldots X - 1\}$, $y \in \{0 \ldots Y - 1\}$.

Algorithm:

Let BorderBlackPixels: $\{(x,y): (x = 0 \text{ or } x = X - 1 \text{ or } y = 0 \text{ or } y = Y - 1) \text{ and EnhancedEdges}(x,y) = 0\}$
PerimetralBackground: $\{(x_n, y_n)$: A path of pixels $\{(x_0, y_0), (x_1, y_1), (x_2, y_2), \ldots, (x_n, y_n)\} \ni (x_0, y_0) \in$ BorderBlackPixels and $(x_{i-1}, y_{i-1})$, $(x_i, y_i)$ are "8 – neighbors" and i $\in \{0, 1, \ldots, n\}$ and $(x_{i-1}, y_{i-1}) \notin$ ObjectOfInterest and $(x_i, y_i) \notin$ ObjectOfInterest Variables description:

x, y: Integer values used as image coordinates
I, ObjectOfInterest, EnhancedEdges, PerimetralBackground: Colored (32-bit) Bi-dimensional Digital images of size width X and height Y
BorderBlackPixels, PerimetralBackground: A list of pixel coordinates

---

The background extraction module 218 may generate background image data 220 indicative of at least the created one or more closed shapes. The background extraction module 218 may store or send the background image data 220 to a hole detection module 222.

The hole detection module 222 may be configured to determine one or more holes within the image of the object 106 based on a determination of a presence of background pixels within the one or more closed shapes. For example, the image of the wrench may include a hole at one end. The hole detection module 222 may traverse the object of interest image depicting the image of the wrench and determine that the hole includes background pixels. The hole detection module 222 upon determining that the hole includes background pixels may remove the background pixels within the hole and replace the background pixels with the white background-fill color. In one implementation, the replacing of the background pixels with the white background-fill pixels includes changing values of the background pixels to values associated with the white background-fill pixels. The hole detection module 222 may generate the resulting image data 118 indicative of the resulting image of the object 106. The resulting image data 118 may be stored in a memory for the user 102 to access or the resulting image data 118 may be sent to the user 102. The user 102 upon accessing the resulting image data 118 may upload the resulting image data 118 to the online shopping website for customers 120 to view and purchase the object 106.

In other implementations, the hole detection module 222 may be based on an algorithm, which may be configured to determine the one or more holes. One implementation of the algorithm is described next in Algorithm 6.

of interest contains a set of image of the wrenches. In yet another example, the hole detection module 222 may be configured to learn how to differentiate between the determined one or more holes that correspond to actual holes containing the background pixels and the determinized one or more holes that are actually part of the object 106 of interest.

Figure 3:
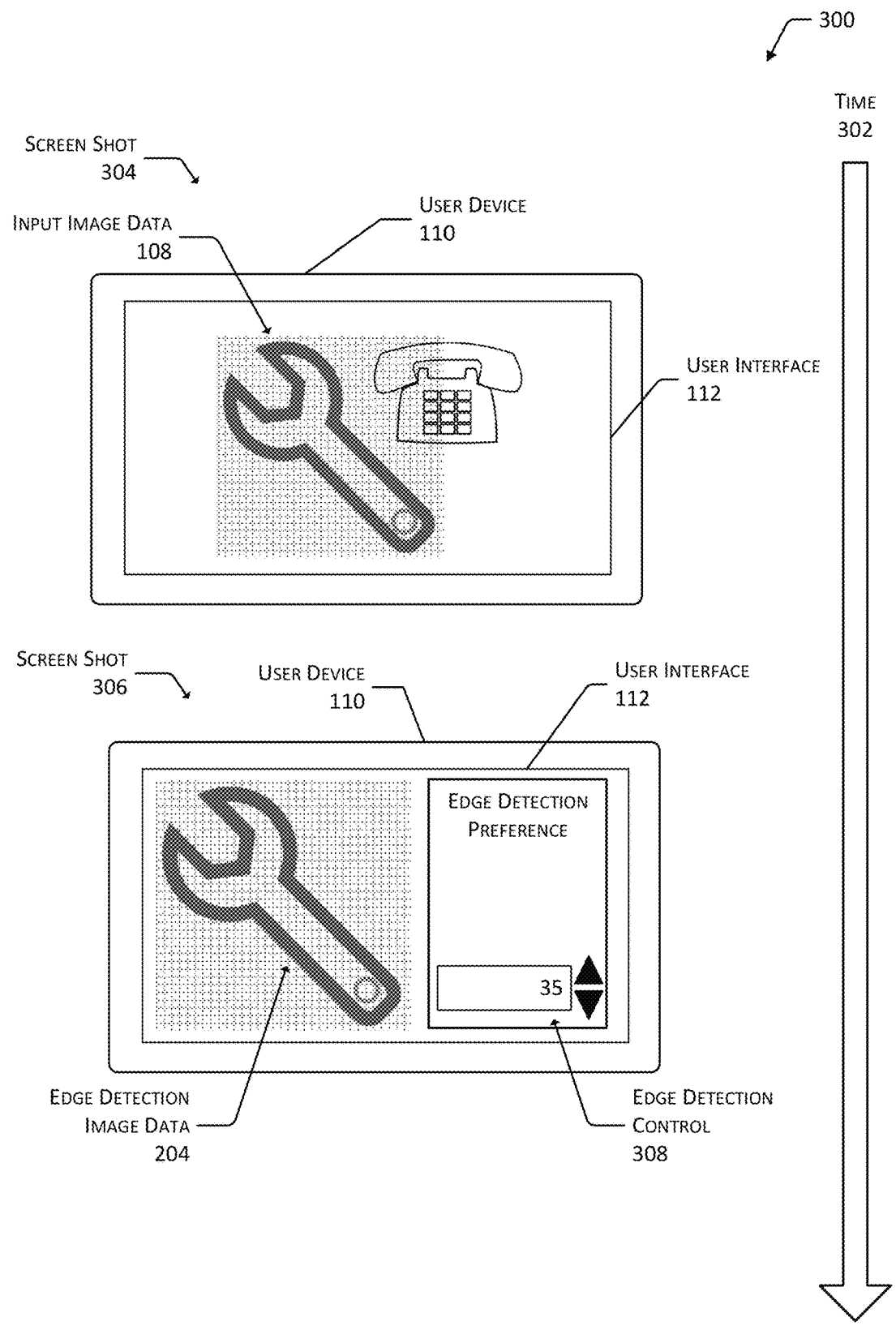
FIGS. 3 and 4 depict an example user interface for presenting image processing of an input image depicting an object.

FIG. 3 is an example 300 of the user interface 112 for presenting image processing of an input image depicting the object 106. In this example, time 302 increases down the page as indicated by an arrow. At screenshot 304, the user device 110 includes the user interface 112. The user interface 112 may depict the input image data 108. For example, the user interface 112 may depict the input image data 108, which may depict the image of the wrench and the tele-

---

ALGORITHM 6

Input:

A digital image I of size X by Y, where I: ($\mathbb{N}_0^2 \to \{[0 ... 255]^3]\}$): $\{(x, y) \to$ (Component$_{Red}$, Component$_{Green}$, Component$_{Blue}$)}and $x \in \{0...X-1\}$, $y \in \{0...Y-1\}$.
A hole detection error tolerance HDET $\in \mathbb{N}$ value.
A digital image PerimetralBackground of size X by Y, where PerimetralBackground: ($\mathbb{N}_0^2 \to \{[0 ... 255]^3]\}$): $\{(x, y) \to$ (Component$_{Red}$, Component$_{Green}$, Component$_{Blue}$)}and $x \in \{0...X-1\}$, $y \in \{0...Y-1\}$.
Output:

A digital image FinalResult of size X by Y, I: ($\mathbb{N}_0^2 \to \{[0 ... 255]^3]\}$): $\{(x, y) \to$ (Component$_{Red}$, Component$_{Green}$, Component$_{Blue}$)}and $x \in \{0...X-1\}$, $y \in \{0...Y-1\}$. This image contains the object of interest with a white background and proper identification of holes within it.
Algorithm:

$$Let: BBCD(c) \leftarrow \sum_{x=0, y=0}^{X-1, Y-1} I(x, y, c) \forall c \ni (x, y) \in PerimetralBackground$$

HoleBuffer(x, y, c):{(x, y) $\forall \in$ (Component$_{Red}$, Component$_{Green}$, Component$_{Blue}$): (x, y) $\notin$ PerimetralBackground and (BBCD(c) - HDET $\leq$ I(x, y, c) $\leq$ BBCD(c) + HDET)}
HoleDetectedBuffer(x, y, c):{(x, y) $\forall$ c $\in$ (Component$_{Red}$, Component$_{Green}$, Component$_{Blue}$): (x, y) $\in$ HoleBuffer or (x, y) $\in$ PerimetralBackground}

$$FinalResult(x, y, c) = \begin{cases} I(x, y, c) \text{ if } (x, y) \in HoleDetecteBuffer(x, y, c) \\ 255 \text{ if } (x, y) \notin HoleDetectedBuffer(x, y, c) \end{cases} \forall c$$

Variables description:
x, y : Integer values used as image coordinates
HDET: A float value that specify the error tolerance when determining pixel-color similarity
I, PerimetralBackground, Final Result: Colored (32-bit) Bi-dimensional Digital images of size width X and height Y
PerimetralBackground: A list of pixel coordinates
HoleBuffer: A list of pixel coordinates that have been identified as a hole in the object of interest
HoleDetectedBuffer: A list of pixel coordinates that are part of the HoleBuffer list but not part of the background at the same time.

---

The system 200 including the server 114 for processing the input image data 108 depicting the object 106 to generate the resulting image data 118 may occur automatically without any user input or with user input.

The edge detection module 202, the edge enhancement module 206, the false-positive identification module 210, the object of interest module 214, the background extraction module 218, and the hole detection module 222, as described above, may include machine learning, which enables the modules an ability to learn without being explicitly programmed. For example, the edge detection module 202 may be configured to learn and detect the one or more edges more accurately. In another example, the false-positive identification module 210 may be configured to learn to specify the area of interest more accurately, such as, being able to determine when the object of interest contains multiple image of the objects 106. For example, the object phone. The user device 110 may receive the input image data 108 from the user 102, as described above.

At screenshot 306, the user interface 112 of the user device 110 may be configured to depict the execution of the edge detection module 202, the edge enhancement module 206, or a combination thereof. In this illustration, the user interface 112 may be depicting the edge detection image data 204 indicative of the detected one or more edges and the execution of the edge enhancement module 206. The user interface 112 may be configured to depict one or more preferences. For example, the user interface 112 may depict edge detection preferences and an edge detection control 308. The edge detection control 308 may be configured to receive a user input to set a parameter or threshold value associated with the execution of the edge enhancement module 206. For example, the input image may be a set of image of the wrenches. In this example, each of the image of the wrenches may have detected edges that include a number of foreground pixels. The edge detection control 308 may receive an input from the user 102 that the portion of the detected edge of a first image of the wrench that meets or comes in contact with the detected edges of another image of the wrench is not an abnormality and to not remove the detected edges.

In other implementations, the one or more preferences depicted via the user interface 112 may include preferences and controls with regard to the extraction of the area of interest. In this implementation, the input image may be a set of image of the wrenches. The false-positive identification module 210 may specify that the area of interest is associated with one of the image of the wrenches, but the user 102 may want the resulting image data 118 to include a depiction of image of all of the wrenches. In this implementation, the user interface 112 may be configured to depict a control, which enables the user 102 to select image of all of the wrenches as the area of interest. The user 102, by selecting images of all of the wrenches as the area of interest, enables the object of interest module 214 to extract the area of interest associated with images of all of the wrenches.

Figure 4:
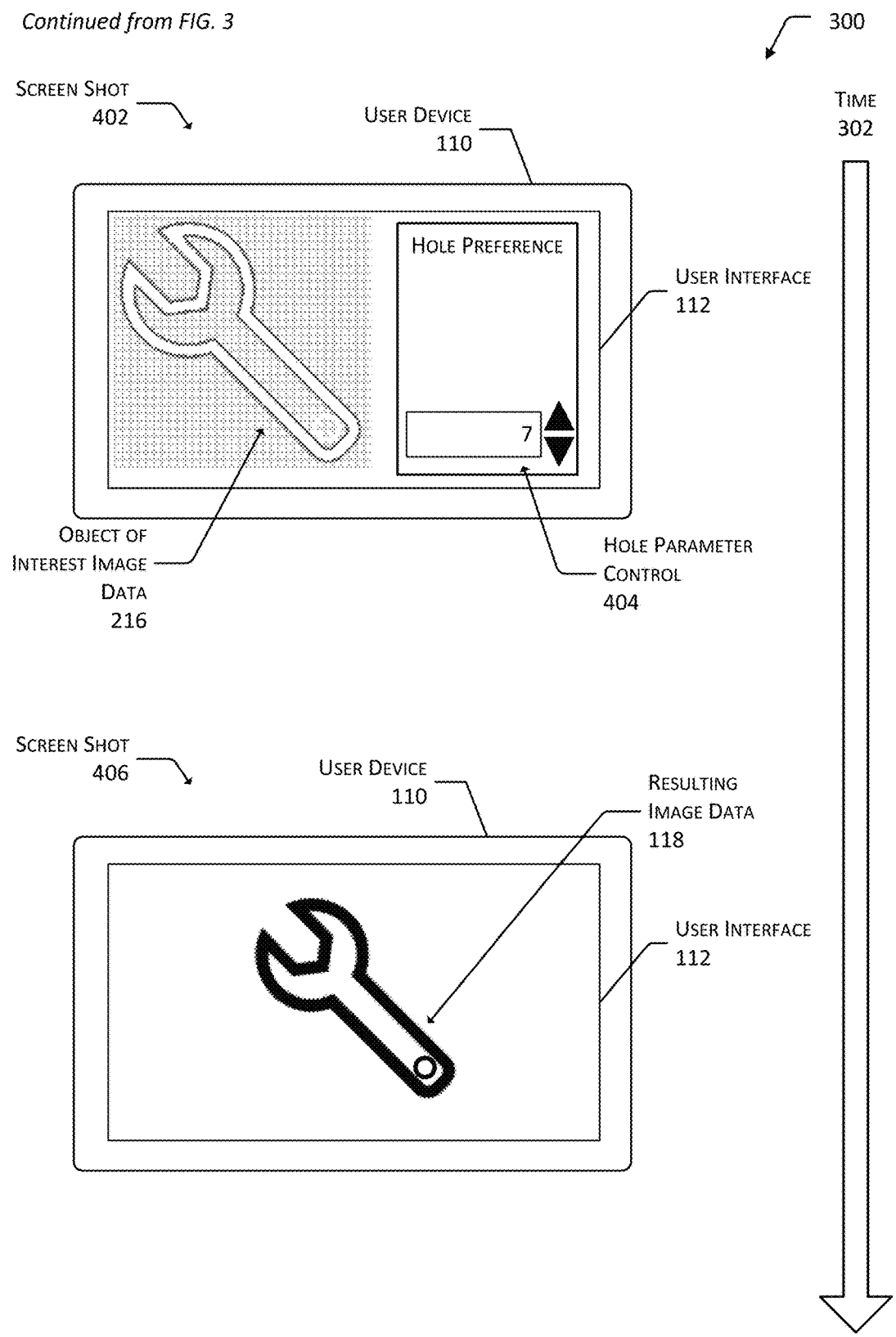

FIG. 4 depicts the continuation of the example 300 from FIG. 3 of the user interface 112 for presenting image processing of an input image depicting the object 106. At screenshot 402, the user interface 112 of the user device 110 may be configured to depict the object of interest image data 216 indicative of the generated object of interest image. The object of interest image may include an image of the object 106. The user interface 112 may be configured to depict one or more preferences. For example, the user interface 112 may depict an image of the wrench. The wrench decpicted in the image may include a hole at one end. The hole detection module 222 when traversing the object of interest image depicting the image of the wrench may determine that the hole includes the background pixels. The hole detection module 222, based on the one or more preferences, may remove the background pixels within the hole, replace the background pixels with the white background-fill pixels, and generate the resulting image data 118. The replacing of the background pixels with the white background-fill pixels includes changing values of the background pixels to values associated with the white background-fill pixels. In this example, the one or more preferences may indicate remove of all detected background pixels from the object of interest image, replace the removed pixels with the white background-fill pixels, and then generate the resulting image data 118.

In another example, the user interface 112 may depict hole preferences and a hole parameter control 404. The hole parameter control 404 may be configured to receive a user input to set a parameter or threshold value associated with the execution of the hole detection module 222. For example, the input image may be a polka dot dress. In this example, the polka dot dress may include white dots. The hole detection module 222 may traverse the image depicting the polka dot dress and determine that the pixels of polka dots are the same or similar to the background pixels. In this example, the hole detection module 222 may send a notification or the user interface 112 may present a notification of the determined one or more areas associated with the polka dots which include the background pixels. In one implementation, the user device 110 may receive an input selecting which of the determined one or more areas is to have the background pixels removed and replaced with the white background-fill pixels. The hole detection module 222 after receiving the input, via the user device 110, may remove the background pixels and replace the removed background pixels with the white background-fill pixels, as described above. In other implementations, the user 102 may set a parameter or threshold value via the hole parameter control 404 with regard to removing the background pixels from the determined one or more areas and replacing the removed background pixels with the white background-fill pixels, as described above. In the example, explained above, the input may indicate to not remove the pixels associated with the polka dots. After receiving the input, the hole detection module 222 may generate the resulting image data 118, as described above.

At screenshot 406, the user device 110, via the user interface 112, may depict the resulting image data 118 indicative of the resulting image of the object 106. The resulting image data 118 may be stored in a memory for the user 102 to access or the resulting image data 118 may be sent to the user device 110 and stored on the user device 110. The user 102 upon accessing the resulting image data 118 may upload the resulting image data 118 to the online shopping website for customers 120 to view and purchase the object 106.

In other implementations, the system may generate a gallery of thumbnails to be presented to the user 102, via the user interface 112. The gallery of thumbnails may be different parameter configurations or filters for the user 102 to select from. For example, the user interface 112 may depict a gallery of thumbnails depicting the input image data 108 indicative of the image of the wrench. One thumbnail may depict an image that includes a portion of the wrench and a portion of the telephone. Another thumbnail may depict an image of the telephone. Yet another thumbnail may depict an image of the wrench with a hole in the middle of the wrench. Another thumbnail may depict an image of the wrench. The user 102 viewing the gallery of thumbnails may select the thumbnail that depicts the image of the wrench and the system may process the input image data 108 to generate the resulting image data 118 indicative of the image of the wrench, as described above.

Figure 5:
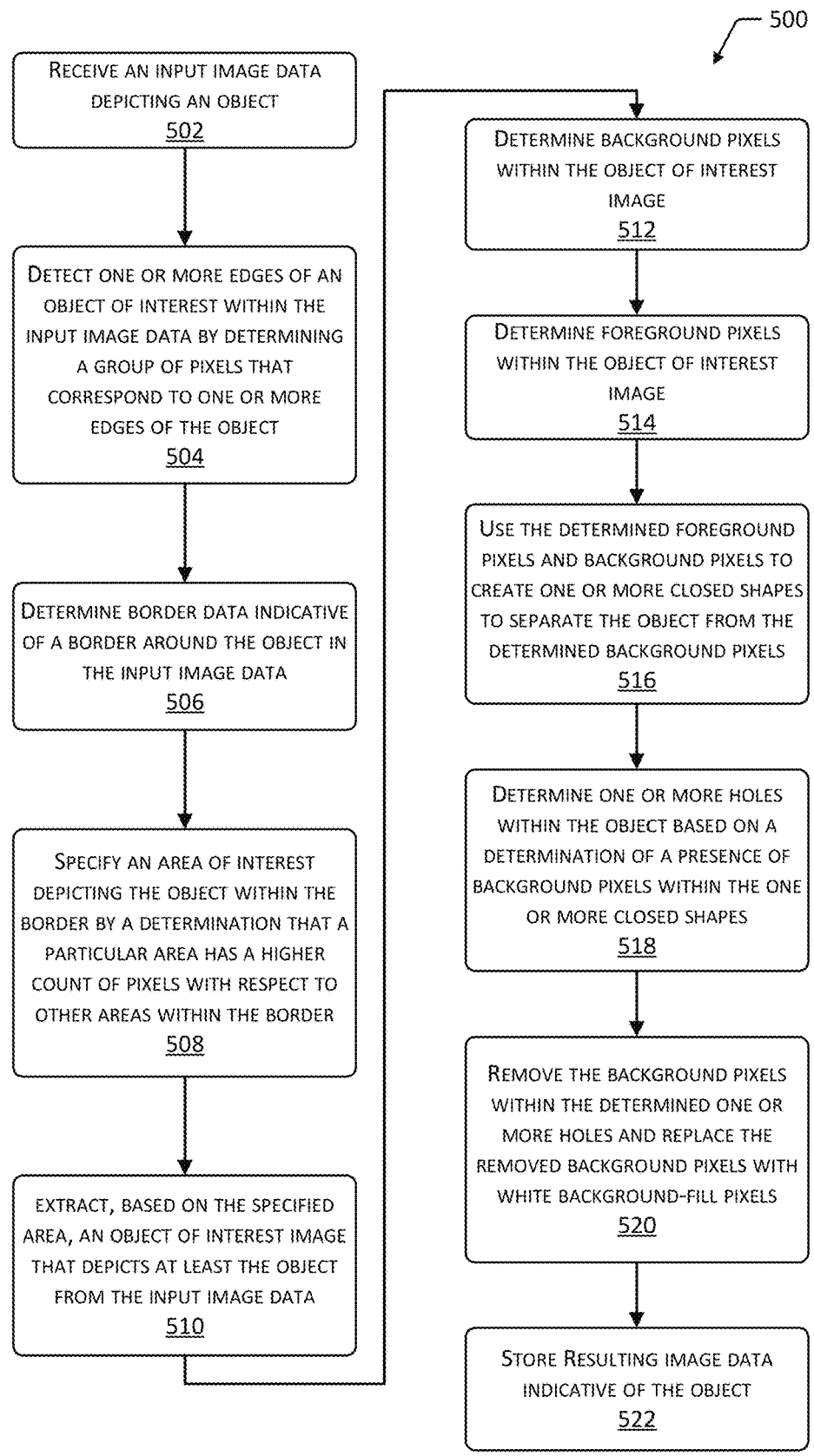
FIG. 5 depicts a flow diagram of a process of processing an input image depicting an object.

FIG. 5 is a flow diagram of a process 500 a flow diagram of a process of processing an input image depicting an object 106. Although the process 500 is described with reference to the flowchart illustrated in FIG. 5, many other methods performing the acts associated with the process 500 may be used. For example, the order of the steps may be changed, some of the steps described may be optional, and additional steps may be included.

At 502, the user device 110 or the server 114 may receive an input image depicting the object 106. The user device 110 or the server 114 may receive the input image, as described above.

At 504, the user device 110 or the server 114 may detect one or more edges of the image of the object 106 within the input image data 108. The user device 110 or the server 114 may include the edge detection module 202. The edge detection module 202 may also be configured to detect one or more edges of the image of the object 106 by determining a first group of pixels that correspond to one or more edges of the image of the object 106 of interest and by determining a second group of pixels that have a color pattern value that corresponds to the background and internal pixels of the image of the image of the object 106 of interest, as described above.

At 506, the user device 110 or the server 114 may determine border data indicative of a border around the image of the object 106 in the input image data 108. The user device 110 or the server 114 may include the edge enhancement module 206 configured to determine border data indicative of a border around the object 106 within the input image data 108. The edge enhancement module 206 may determine the border data by comparing the one or more detected edges to the edge threshold value to determine whether the detected edges accurately represent an edge of the image of the object 106 or not, as described above.

At 508, the user device 110 or the server 114 may specify the area of interest depicting the image of the object 106 within the border by a determination that a particular area has a higher count of pixels with respect to other areas within the border. The user device 110 or the server 114 may include the false-positive identification module 210 configured to specify the area of interest. In one implementation, the false-positive identification module 210 may determine the first count of pixels a first area has within the input image and the second count of pixels a second area has within the input image. The false-positive identification module 210 may compare the first count of pixels to the second count of pixels to determine which count of pixels is higher.

At 510, the user device 110 or the server 114 may extract, based on the specified area, an object of interest image that depicts at least the image of the object 106 from the input image data 108. The user device 110 or the server 114 may include the object of interest module 214 configured to extract the area of interest depicting the image of the object 106 to generate the object of interest image, as described above.

At 512, the user device 110 or the server 114 may determine, via the background extraction module 218, the background pixels within the object of interest image, as described above.

At 514, the user device 110 or the server 114 may determine, via the background extraction module 218, the foreground pixels within the object of interest image, as described above.

At 516, the user device 110 or the server 114 may use the determined foreground pixels and the background pixels to create one or more closed shapes to separate the image of the object from the determined background pixels. The user device 110 or the server 114 may include the background extraction module 218 configured to create the one or more closed shapes, as described above.

At 518, the user device 110 or the server 114 may determine one or more holes within the image of the object 106 based on a determination of a presence of background pixels within the one or more closed shapes. The user device 110 or the server 114 may include the hole detection module 222 to determine the one or more holes, as described above.

At 520, the user device 110 or the server 114 may remove the background pixels within the determined one or more holes and replace the removed background pixels with the white background-fill pixels. The user device 110 or the server 114 may include the hole detection module 222, which may be configured to remove the background pixels within the determined one or more holes, as described above.

At 522, the user device 110 or the server 114 may store the resulting image data 118 indicative of the image of the object 106, as described above.

Figure 6:
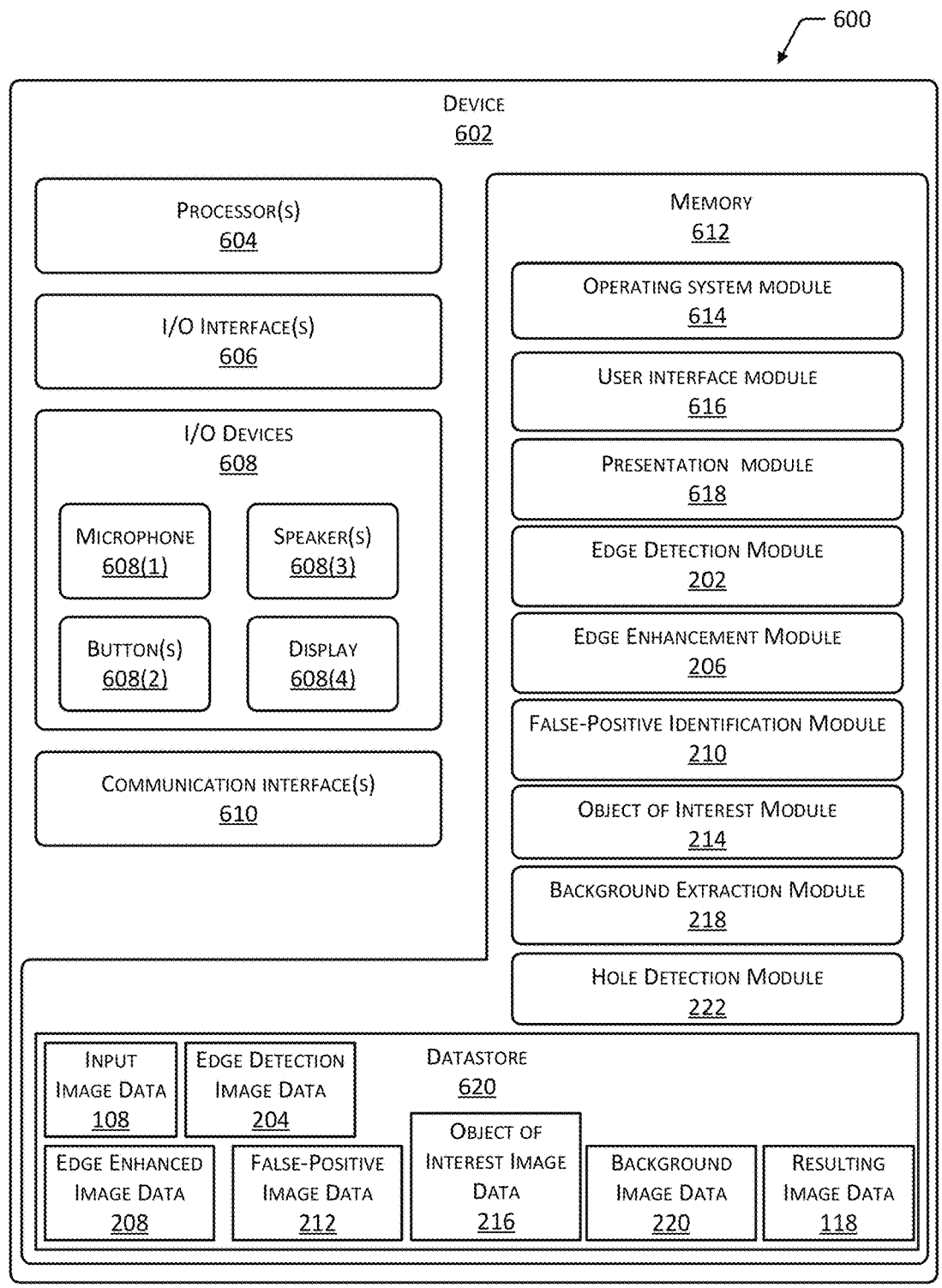
FIG. 6 illustrates a block diagram of a device to process input images.

FIG. 6 illustrates a block diagram 600 of a device 602. The device 602 may be the user device 110 or the server 114. The device 602 is illustrative and non-limiting, and may be a desktop computer, a tablet computer, server, a wearable computer, an e-book reader, a media device, a cellular phone, a laptop computer, or another suitable apparatus. The device 602 may include one or more processors 604 configured to execute one or more stored instructions. The processor(s) 604 may comprise one or more cores, and may also be referred to as hardware processors.

The device 602 may include one or more input/output (I/O) interface(s) 606 to allow the processor(s) 604 or other components of the device 602 to communicate with various other devices 602, other computing devices, the server 114, the user device 110, other services that may include one or more of the edge detection module 202, the edge enhancement module 206, the false-positive identification module 210, the object of interest module 214, the background extraction module 218, the hole detection module 222, web-based resources, and so on. The I/O interfaces 606 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 606 may couple to one or more I/O devices 608. The I/O devices 608 may include one or more input devices such as a keyboard, a mouse, a microphone 608(1), the digital camera 104, user input buttons 608(2), and so forth. The I/O devices 608 may also include output devices such as audio speakers 608(3), one or more displays 608(4), and so forth. In some embodiments, the I/O devices 608 may be physically incorporated within the device 602, or they may be externally placed. The I/O devices 608 may include various other devices as well.

The device 602 may also include one or more communication interfaces 610. The communication interface(s) 610 are configured to provide communications with other devices, web-based resources, the server 114, the user device 110, other services that may include one or more of the edge detection module 202, the edge enhancement module 206, the false-positive identification module 210, the object of interest module 214, the background extraction module 218, the hole detection module 222, routers, wireless access points, and so forth. The communication interfaces 610 may include wireless functions, devices configured to couple to one or more networks including local area networks (LANs), wireless LANs, wide area networks (WANs), and so forth. The device 602 may also include one or more busses or other internal communications hardware or software that allow for the transfer of data between the various modules and components of the device 602.

The device 602 includes one or more memories 612. The memory 612 comprises one or more computer-readable storage media (CRSM). The memory 612 provides storage of computer readable instructions, which enables the user device 110 to present the user interface 112, the user device 110 or the server 114 to execute one or more of the edge detection module 202, the edge enhancement module 206, the false-positive identification module 210, the object of interest module 214, the background extraction module 218, the hole detection module 222, data structures, program modules, and other data used during the operation of the user device 110 or the server 114. The memory 612 may include at least one operating system (OS) module 614. Respective OS modules 614 are configured to manage hardware devices such as the I/O interface(s) 606, the I/O devices 608, the communication interface(s) 610, and provide various services to applications or modules executing on the processors 604.

Also, stored in the memory 612 may be one or more of the following modules. These modules may be executed as foreground applications, background tasks, daemons, and so forth. A user interface module 616 may be configured to provide the user interface 112, and may also provide one or more application programming interfaces. The user interface module 616 may be configured to operate with information encoded as Hypertext Markup Language (HTML) files, Extensible Markup Language (XML) files, or in another suitable format or language. The user interface module 616 is configured to accept inputs and send outputs using the I/O interfaces 606, the communication interfaces 610, or both.

The memory 612 may also include a presentation module 618. The presentation module 618 may be configured to present the input image data 108, the resulting image data 118, the edge detection image data 204, the edge enhanced image data 208, the false-positive image data 212, the object of interest image data 216, the background image data 220, the edge detection control 308, the hole parameter control 404, and so forth.

The memory 612 may also include the edge detection module 202. The edge detection module 202 may determine the first group of pixels that have a first color value, determine a second group of pixels that have a second color value, detect one or more edges of the image of the object 106, or a combination thereof, as described above.

The memory 612 may also include the edge enhancement module 206. The edge enhancement module 206 may determine the border data by comparing the one or more detected edges to an edge parameter to determine whether the detected edges have a high probability to represent an edge of the image of the object 106 or not, as described above.

The memory 612 may include the false-positive identification module 210. The false-positive identification module 210 may be configured to specify an area of interest by a determination that a particular area occupies a greater amount of space with respect to other areas within the border, as described above.

The memory 612 may include the object of interest module 214. The object of interest module 214 may be configured to extract the area of interest depicting the image of the object 106 to generate the object of interest image. The object of interest module 214 may determine the area of interest based on the false-positive image data 212 indicative of the area with the highest count of pixels, as described above.

The memory 612 may also include the background extraction module 218. The background extraction module 218 may create one or more closed shapes to separate the image of the object 106 from background pixels, as described above.

The memory 612 may include the hole detection module 222. The hole detection module 222 may be configured to determine one or more holes within the image of the object 106 based on a determination of a presence of background pixels within the one or more closed shapes, as described above.

The memory 612 may also include datastore 620 to store information. The datastore 620 may use a flat file, database, linked list, tree, executable code, or other data structure to store the information. In some implementations, the datastore 620 or a portion of the datastore 620 may be distributed across one or more user devices 110 or computing devices including the server 114, network attached storage apparatus, and so forth.

The datastore 620 may store the input image data 108, the edge detection image data 204, the edge enhanced image data 208, the false-positive image data 212, the object of interest image data 216, the background image data 220, the resulting image data 118, or a combination thereof. As described above, the input image data 108 may be indicative of the image of the object 106. The edge detection image data 204, as described above, may be indicative of the detected one or more edges. The edge enhanced image data 208 may be indicative of the border data, as described above. The false-positive image data 212 may be indicative of the specified area of interest, as described above. The object of interest image data 216 may be indicative of the generated object of interest image, as described above. The background image data 220 may be indicative of at least the created one or more closed shapes, as described above. The resulting image data 118 may be indicative of a processed image of the object 106, as described above.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A device comprising:
at least one memory storing computer-executable instructions; and
at least one processor in communication with the at least one memory, the at least one processor executes the computer-executable instructions to:
receive an input image depicting a first object and a second object;
determine a first group of pixels that correspond to one or more edges of the first object and the second object represented by the input image;
determine a second group of pixels that correspond to background pixels in the input image;
assign the first group of pixels to a first color value;
assign the second group of pixels to a second color value;
determine a transition from the first color value to the second color value;
detect the one or more edges of the first object and the second object within the input image based on the transition;
compare the detected one or more edges to an edge threshold value to determine whether the detected one or more edges form an edge of the first object and the second object;
determine border data indicative of a border around the first object and the second object in the input image based on the comparison;
determine a third group of pixels within the border around the first object;
determine a fourth group of pixels within the border around the second object;
compare the third group of pixels to the fourth group of pixels to determine that the third group of pixels has a higher count of pixels;
determine an area of interest around the third group of pixels;
generate a first image from pixels within the determined area of interest, wherein the first image depicts the first object;
determine the background pixels within the first image;
determine foreground pixels within the first image;
use the determined background pixels and foreground pixels to create one or more closed shapes to separate the first object from the determined background pixels;
determine one or more holes within the first object based on a determination of a presence of background pixels within the one or more closed shapes;
remove the background pixels within the determined one or more holes;
replace the removed background pixels with white background-fill pixels; and
store a resulting image depicting the first object.

2. The device of claim 1, wherein the at least one processor further executes the computer-executable instructions to:
determine a fifth group of pixels having a second color value associated with the background pixels and interior pixels of the first object;
set the first group of pixels that correspond to the one or more edges of the first object to a third color value; and
set the second group of pixels having the second color value to a fourth color value.

3. The device of claim 1, wherein the at least one processor further executes the computer-executable instructions to:
send a notification indicating the determined one or more holes within the first image; and
receive an input selecting which of the determined one or more holes to have the background pixels replaced with the white background-fill pixels.

4. A method comprising:
determining a first group of pixels corresponding to one or more edges of an object of interest within an input image;
determining a second group of pixels that correspond to background pixels in the input image;
assigning the first group of pixels to a first color value;
assigning the second group of pixels to a second color value;
determining a transition from the first color value to the second color value;
detecting the one or more edges of the object of interest within the input image based on the transition;
comparing the detected one or more edges to an edge parameter to determine whether the detected one or more edges form an edge of the object of interest;
determining border data indicative of a border around the object of interest based on the comparing;
generating a first image from pixels within the border data, wherein the first image depicts the object of interest;
determining background pixels within the first image;
using the background pixels for creating one or more closed shapes separating the object of interest from the determined background pixels;
determining one or more holes within the one or more closed shapes; and
storing a resulting image depicting the object of interest.

5. The method of claim 4, further comprising:
determining a first count of pixels a first area has within the input image;
determining a second count of pixels a second area has within the input image;
comparing the first count of pixels to the second count of pixels for determining which count of pixels is higher;
specifying a particular area with the higher count of pixels to be depicting the object of interest; and
extracting the specified particular area from the input image for generating the first image depicting the object of interest.

6. The method of claim 5, further comprising:
determining background pixels and foreground pixels within the first image that are used for creating the one or more closed shapes.

7. The method of claim 6, wherein the determining one or more holes further comprising:
determining a presence of the background pixels within the one or more closed shapes;
removing the background pixels within the one or more closed shapes;
replacing the removed background pixels with a third count of pixels having a third color value; and
generating the resulting image depicting the object of interest.

8. The method of claim 4, further comprising:
determining a first count of pixels a first area has within the input image;
determining a second count of pixels a second area has within the input image;

comparing the first count of pixels to the second count of pixels for determining which count of pixels is higher;
specifying a particular area with the higher count of pixels to be depicting the object of interest;
extracting the specified particular area from the input image for generating the first image depicting the object of interest; and
determining one or more areas within the first image that include the background pixels.

9. The method of claim 8, further comprising:
removing the background pixels within the determined one or more areas; and
replacing the removed background pixels with a third count of pixels having a third color value.

10. The method of claim 8, further comprising:
sending a notification of the determined one or more areas within the first image;
receiving an input selecting which of the determined one or more areas to have the background pixels removed from the first image;
removing the background pixels based on the input; and
replacing the removed background pixels with a third count of pixels having a third color value.

11. The method of claim 4, further comprising:
setting the first group of pixels corresponding to the one or more edges of the object of interest to white; and
setting the second group of pixels having the second color value to black.

12. The method of claim 4, further comprising:
determining a first count of pixels a first area has within the input image;
determining a second count of pixels a second area has within the input image;
comparing the first count of pixels to the second count of pixels to determine which count of pixels is higher;
specifying a particular area with the higher count of pixels to be depicting the object of interest;
extracting the specified particular area from the input image to generate the first image depicting the object of interest;
receiving a user input to set a hole parameter that indicates whether the determined background pixels is associated with the determined one or more holes; and
determining a presence of a third count of pixels within the determined one or more holes.

13. The method of claim 4, further comprising:
determining a first count of pixels a first area has within the input image;
determining a second third count of pixels a second area has within the input image;
comparing the first count of pixels to the count of pixels of pixels to determine which count of pixels is higher;
specifying an area with the higher count of pixels as a particular area;
sending a notification indicating the particular area with the higher count of pixels;
receiving a user input setting one or more parameters associated with removal of the first count of pixels from the first image; and
setting the first count of pixels to have a third color value.

14. A system comprising:
a device with at least one processor that executes instructions to:
determine a first group of pixels in an input image that correspond to one or more edges of an object of interest;
determine a second group of pixels that correspond to background pixels in the input image;
assign the first group of pixels to a first color value;
assign the second group of pixels to a second color value;
determine a transition from the first color value to the second color value;
detect the one or more edges of the object of interest within the input image based on the transition;
compare the detected one or more edges of the object of interest to an edge threshold value to determine whether the detected one or more edges form an edge of the object of interest;
use the detected one or more edges to create one or more closed shapes which separate the object of interest from a remainder of pixels in the input image;
generate a first image from pixels within the one or more closed shapes, wherein the first image depicts the object of interest;
determine one or more holes within the one or more closed shapes; and
store a resulting image depicting the object of interest.

15. The system of claim 14, wherein the at least one processor further executes instructions to:
determine a first count of pixels a first area has within the input image;
determine a second count of pixels a second area has within the input image;
compare the first count of pixels to the second count of pixels to determine which count of pixels is higher;
specify a particular area with the higher count of pixels to be depicting the object of interest;
extract the specified particular area from the input image to generate the first image depicting the object of interest; and
determine a presence of background pixels within the determined one or more holes.

16. The system of claim 15, wherein the at least one processor further executes instructions to:
receive a user input to set a hole parameter that indicates whether the determined presence of background pixels is associated with the determined one or more holes.

17. The system of claim 15, wherein the at least one processor further executes instructions to:
send a notification indicating the determined one or more holes within the first image;
receive an input selecting which of the determined one or more holes to have the background pixels removed from the first image;
remove the background pixels based on the input;
replace the removed background pixels with a third count of pixels having a third color value; and
generate the resulting image.

18. The system of claim 15, wherein the at least one processor further executes instructions to:
receive a user input setting one or more parameters associated with removal of the background pixels from the first image;
remove the background pixels from the first image based on the one or more parameters; and
replace the removed background pixels with a third count of pixels having a third color value.

19. The system of claim 14, wherein the at least one processor further executes instructions to:
determine a first count of pixels a first area has within the input image;

determine a second count of pixels a second area has within the input image;

compare the first count of pixels to the second count of pixels to determine which count of pixels is higher;

specify an area with the higher count of pixels as a particular area; and send a notification indicating the particular area with the higher count of pixels.

20. The system of claim 19, wherein the at least one processor further executes instructions to:

receive a user input selecting a third area that contains at least the particular area; and extract the third area from the input image to generate the first image depicting the object of interest.

* * * * *

UNITED STATES PATENT AND TRADEMARK OFFICE
CERTIFICATE OF CORRECTION

PATENT NO. : 10,713,792 B1
APPLICATION NO. : 15/406241
DATED : July 14, 2020
INVENTOR(S) : Risto Fermin Rangel Kuoppa et al.

Page 1 of 1

It is certified that error appears in the above-identified patent and that said Letters Patent is hereby corrected as shown below:

In the Claims

Column 25, Claim 12, Lines 43-44:
Currently reads: "pixels is associated with".
Where it should read: --pixels are associated with--.

Column 25, Claim 13, Line 50:
Currently reads: "determining a second third count of pixels".
Where it should read: --determining a second count of pixels--.

Column 25, Claim 13, Lines 52-53:
Currently reads: "count of pixels of pixels to determine".
Where it should read: --count of pixels to determine--.

Signed and Sealed this
Eighteenth Day of August, 2020

Andrei Iancu
*Director of the United States Patent and Trademark Office*